(12) United States Patent
Hayes et al.

(10) Patent No.: US 10,744,699 B2
(45) Date of Patent: Aug. 18, 2020

(54) POLYETHYLENE TEREPHTHALATE FOAM PLATE

(71) Applicant: REYNOLDS CONSUMER PRODUCTS LLC, Lake Forest, IL (US)

(72) Inventors: Thomas J. Hayes, McHenry, IL (US); James N. Gomoll, Genoa City, WI (US)

(73) Assignee: REYNOLDS CONSUMER PRODUCTS LLC, Lake Forest, IL (US)

( * ) Notice: Subject to any disclaimer, the term of this patent is extended or adjusted under 35 U.S.C. 154(b) by 0 days.

(21) Appl. No.: 15/819,488

(22) Filed: Nov. 21, 2017

(65) Prior Publication Data

US 2019/0152124 A1 May 23, 2019

(51) Int. Cl.
| | |
|---|---|
| B29C 51/00 | (2006.01) |
| A47G 19/00 | (2006.01) |
| A47G 19/03 | (2006.01) |
| B29K 105/04 | (2006.01) |
| B29L 7/00 | (2006.01) |
| B29K 25/00 | (2006.01) |
| B29L 31/00 | (2006.01) |
| B29K 67/00 | (2006.01) |

(52) U.S. Cl.
CPC ............ *B29C 51/002* (2013.01); *A47G 19/00* (2013.01); *A47G 19/03* (2013.01); *B29K 2023/06* (2013.01); *B29K 2025/06* (2013.01); *B29K 2067/003* (2013.01); *B29K 2105/04* (2013.01); *B29K 2995/0039* (2013.01); *B29L 2007/002* (2013.01); *B29L 2031/7404* (2013.01)

(58) Field of Classification Search
None
See application file for complete search history.

(56) References Cited

U.S. PATENT DOCUMENTS

| | | | | |
|---|---|---|---|---|
| 3,720,365 | A * | 3/1973 | Unger | B65D 1/34 229/406 |
| 7,121,422 | B2 * | 10/2006 | Gitschlag | A47G 19/065 220/575 |
| 2010/0163450 | A1 * | 7/2010 | Branch | B29C 44/3446 206/524.6 |
| 2010/0255162 | A1 * | 10/2010 | Becraft | B65D 81/2076 426/264 |

* cited by examiner

*Primary Examiner* — Chinessa T. Golden
(74) *Attorney, Agent, or Firm* — Baker Botts L.L.P.

(57) ABSTRACT

Plate having a bottom wall having an outer perimeter, an upper surface, and a lower support surface defining a horizontal reference plane. The plate further includes a sidewall extending upwardly and outwardly from the outer perimeter at an angle "a" of between about 30° to about 35° relative to a vertical axis perpendicular to the horizontal reference plane. Extending laterally outwardly from an upper edge of the sidewall is a rim. Extending downwardly from an outer edge of the rim and terminating at a free end is a turndown flange. The plate comprises a monolithic structure of polyethylene terephthalate foam. Method of forming the plate is also provided.

28 Claims, 6 Drawing Sheets

POLYETHYLENE TEREPHTHALATE FOAM PLATE

BACKGROUND

Field of the Disclosed Subject Matter

The disclosed subject matter relates to a disposable plate made of polyethylene terephthalate foam, for example a disposable polyethylene terephthalate foam plate for holding items within a contained area.

Description of Related Art

Plates allow users to carry a number of items, for example various food items. It is desirable for a plate to be configured to retain items within a contained area of the plate. However, disposable plates often have gradual and shallow sidewalls to allow a plurality of plates to be stacked, such as for shipping and storage. Low and shallow sidewalls can allow items to easily slide off the plate, as well as can decrease the plate strength.

Various techniques have been attempted to improve plate properties, such as sidewall dimensions and configurations. However, such techniques may render undesirable disadvantages such as manufacturing issues, decreased efficiency in stacking, reduced plate strength, and increased cost. Further attempts have been made to reduce these disadvantages by adjusting the material properties of plates. However, such efforts have been unsatisfactory for various reasons, such as increased manufacturing cost, increased weight, and decreased strength. As such, there is a continued need for a disposable plate having improved structural dimensions, high strength, and low manufacturing cost.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, a plate comprising polyethylene terephthalate foam is provided, as well as a method for forming the plate.

As embodied herein, a plate of the disclosed subject matter includes a bottom wall having an outer perimeter, an upper surface, and a lower support surface defining a horizontal reference plane. The plate includes a sidewall extending upwardly and outwardly from the outer perimeter at an angle "a" between about 30° to about 35° relative to a vertical axis perpendicular to the horizontal reference plane. A rim extends laterally outwardly from an upper edge of the sidewall. The plate further includes a turndown flange extending downwardly from an outer edge of the rim and terminating at a free end. The plate of the disclosed subject matter comprises a monolithic structure of polyethylene terephthalate foam.

Furthermore, and as embodied herein, the angle "a" of the sidewall relative to the vertical axis can be about 34.25°. The polyethylene terephthalate foam can be amorphous polyethylene terephthalate foam. The plate can consist essentially of polyethylene terephthalate foam, i.e., non-substantial additives or the like can be included in or with the polyethylene terephthalate foam, such as colorants and the like, without altering the characteristics of the polyethylene terephthalate foam alone. The polyethylene terephthalate foam material can have a basis weight between about 10.50 and 20 grams per 100 square inch. With the plate supported at a location proximate the outer perimeter, a load between about 0.75 and 2.1 pounds applied at a center of the plate can deflect the plate about 1.0 inch measured at the center of the plate. The plate can comprise a strength to weight ratio of between 0.12 and 0.18 pound of force per gram. The plate can have a maximum thickness between about 0.03 and 0.10 inch. The pressure required to puncture the plate can be between 1480 and 3840 pounds per square inch. The load required to puncture the plate can be between 1.04 and 2.7 pounds applied over an area of about 0.000707 square inch.

The bottom wall can have a convex shape in cross-sectional side view extending upwardly and inwardly from the outer perimeter. The outer perimeter of the bottom wall can define a circle in plan view. A bottom-sidewall interface can be defined between the bottom wall and the sidewall, the bottom-sidewall interface having a radius in cross-sectional side view. The radius of the bottom-sidewall interface can be about 0.63 inch.

Additionally, and as embodied herein, the sidewall can have an overall sidewall height "sh" defined vertically between the horizontal reference plane and the upper edge of the sidewall of between 0.7 inch and 1.0 inch. A sidewall-rim interface can be defined between the sidewall and the rim, the sidewall-rim interface can have a radius in cross-sectional side view. The radius of the sidewall-rim interface can be about 0.24 inch. The rim can have a rim width "rw" defined laterally between the upper edge of the sidewall and the outer edge of the rim of between about 0.30 and 0.50 inch. The rim width "rw" can be about 0.40 in. An upper surface of the rim can include an indicia. A rim-turndown interface can be defined between the rim and the turndown flange, the rim-turndown interface can have a radius in cross-sectional side view. The radius of the rim-turndown interface can be about 0.37 inch. The turndown flange can have a turndown height "tdh" defined vertically between the outer edge of the rim and the free end of between about 0.06 and 0.38 inch. The turndown height "tdh" can be about 0.18 inch. The rim can have a rim width "rw" defined laterally between the upper edge of the sidewall and the outer edge of the rim, and the ratio of the turndown height to the rim width (tdh:rw) can be about 1:2.19. The plate can have a maximum lateral cross dimension "d" in plan view of less than 10.5 inches.

The disclosed subject matter also includes a method of forming the plate including providing a sheet of polyethylene terephthalate foam and thermoforming the polyethylene terephthalate foam into a plate of the disclosed subject matter. Additionally or alternatively, the plate can be formed using a variety of other suitable manufacturing techniques for polyethylene terephthalate.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

DETAILED DESCRIPTION

Figure 1:
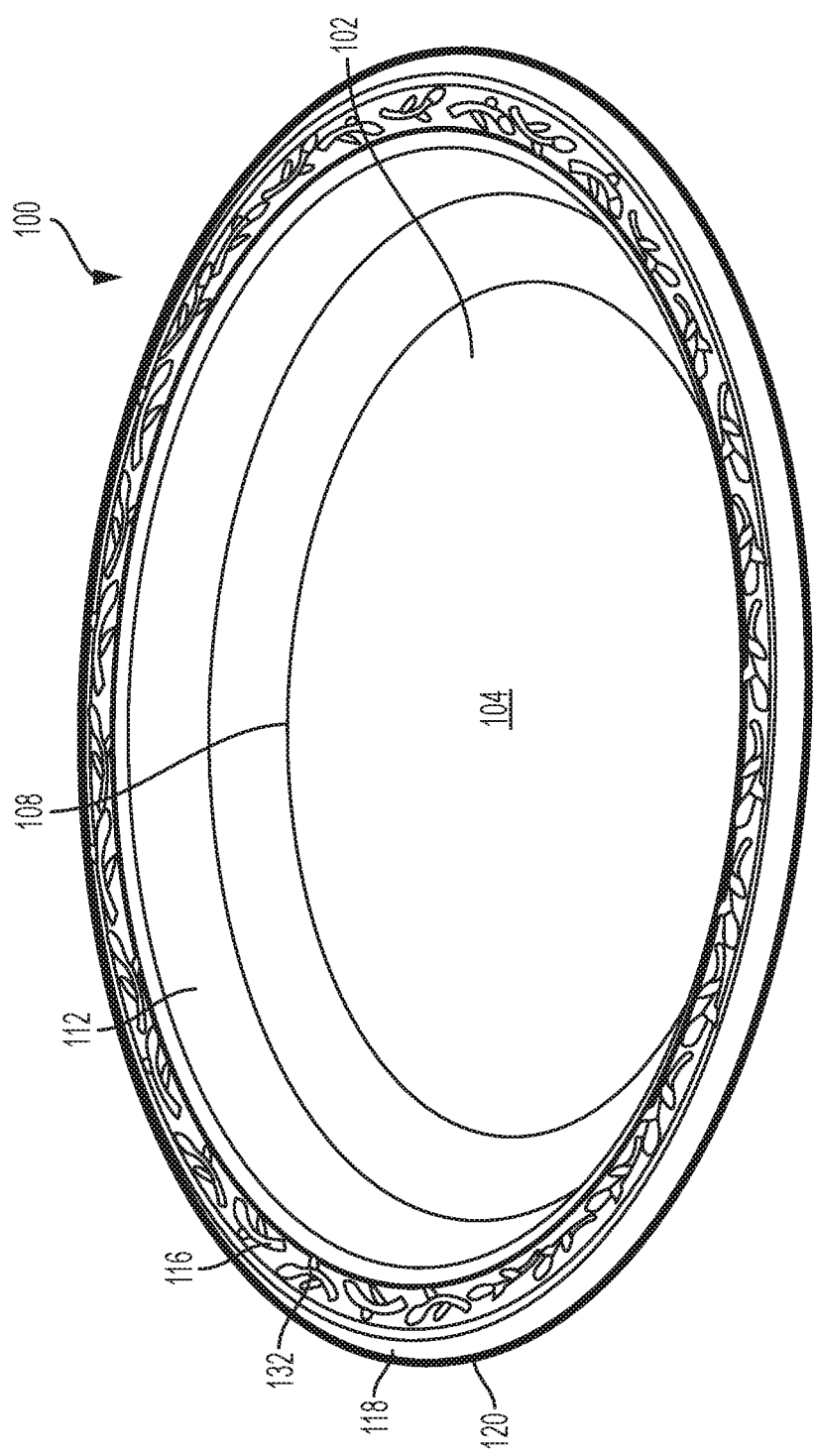
FIG. 1 is a top perspective view of an embodiment of a plate in accordance with the disclosed subject matter.

Reference will now be made in detail to the various exemplary embodiments of the disclosed subject matter, exemplary embodiments of which are illustrated in the accompanying drawings. The structure and corresponding material of the disclosed subject matter will be described in conjunction with the detailed description of the plate.

The apparatus and methods presented herein can be used for a plate. As used herein, "plate" and "disposable plate" will be used interchangeably to refer to various disposable containers (e.g., bowls) for holding and transporting items such as food items and other perishable and non-perishable products. As used herein the term "disposable" refers to an item intended to be discarded after limited use due to the cost of manufacture and relative durability. Use is not limited to a one-time use and can apply to items used a number of times before being discarded. As used herein, the term "about" is intended to mean with a suitable range of tolerance as recognized by one of skill in the art.

In accordance with the disclosed subject matter herein, the disposable plate generally includes a bottom wall having an outer perimeter, an upper surface, and a lower support surface defining a horizontal reference plane. The plate includes a sidewall extending upwardly and outwardly from the outer perimeter at an angle "a" of between about 30° to about 35° relative to a vertical axis perpendicular to the horizontal reference plane. A rim extends laterally outwardly from an upper edge of the sidewall. The plate further includes a turndown flange extending downwardly from an outer edge of the rim and terminating at a free end. The plate comprises a monolithic structure of polyethylene terephthalate foam.

The accompanying figures, where like reference numerals refer to identical or functionally similar elements, throughout the separate views, serve to further illustrate the various embodiments and to explain various principles and advantages all in accordance with the disclosed subject matter. For purpose of explanation and illustration, and not limitation, exemplary embodiments of the disposable plate are shown in FIGS. 1-6. The disposable plate is suitable for use with a wide variety of hot and cold food items, such as fruit slices, chips, bread sticks, candies, and other suitable bite-size food items, alone or in combination with larger food items, such as pizza, tacos, burritos, burgers, or the like. The disposable plate is also suitable and beneficial for use with hot, prepared food items, such as chicken nuggets, French fries, onion rings, and popcorn shrimp, that are typically served with a condiment for dipping, such as ketchup, mustard, mayonnaise, or vinegar, wherein the plate can be used for storing, transporting, and/or re-using such food items as well as serving the food items and allowing for dipping of the food items into the condiment. Food items can be placed directly on the plate surface, or contained in secondary packaging, for example, cartons, portion cups, fry boats or the like. It will be recognized that the disposable plate can also be suitable for storing, transporting, and/or re-using non-food items, such as electronic components, mechanical parts, tools, toys or any other suitable non-food items. For purpose of illustration only, and not limitation, reference will made herein to a disposable plate intended to contain food items. The disposable plate described herein, and methods of using the plate, are not limited to the illustrative embodiments described or depicted herein.

Figure 2:
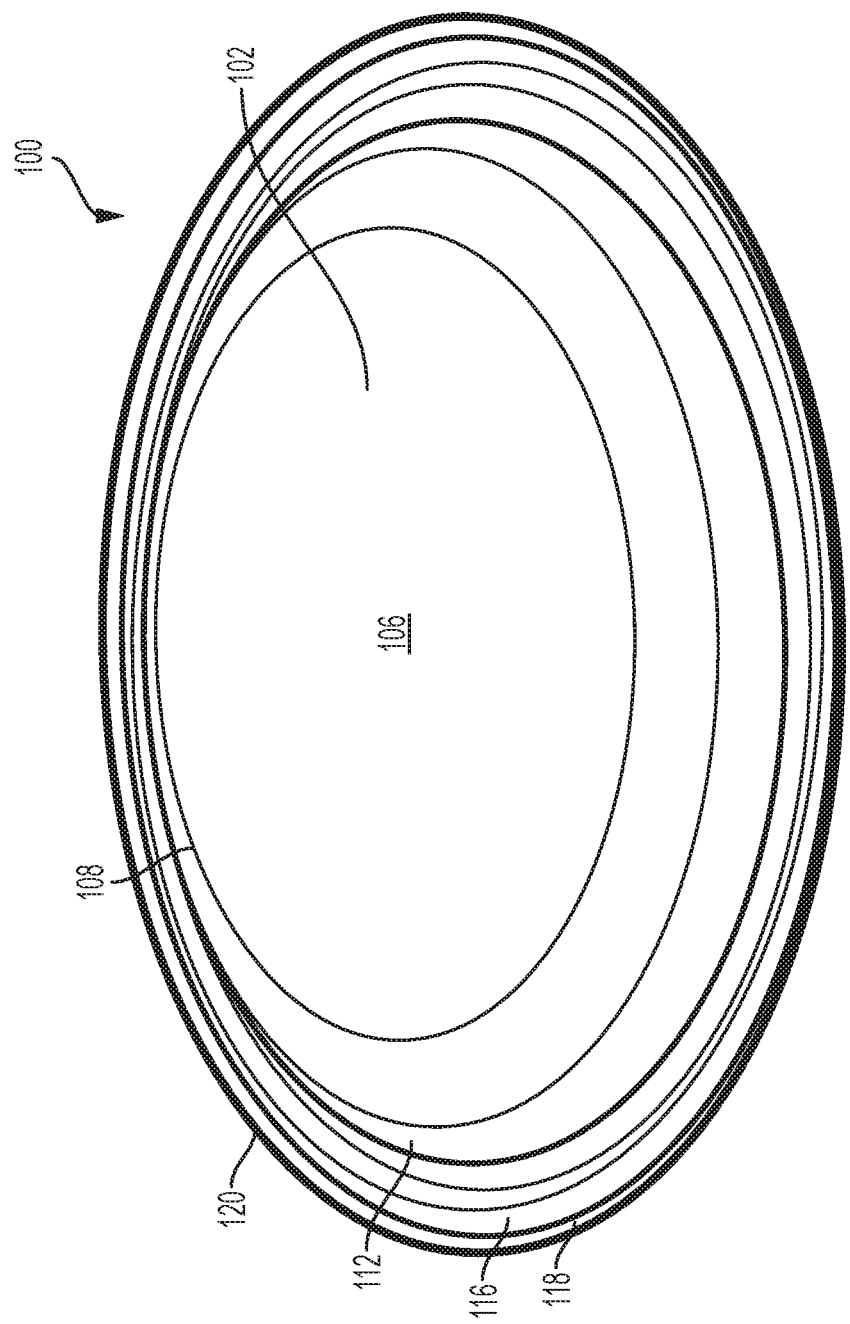
FIG. 2 is a bottom perspective view of the plate of FIG. 1.
Figure 3:
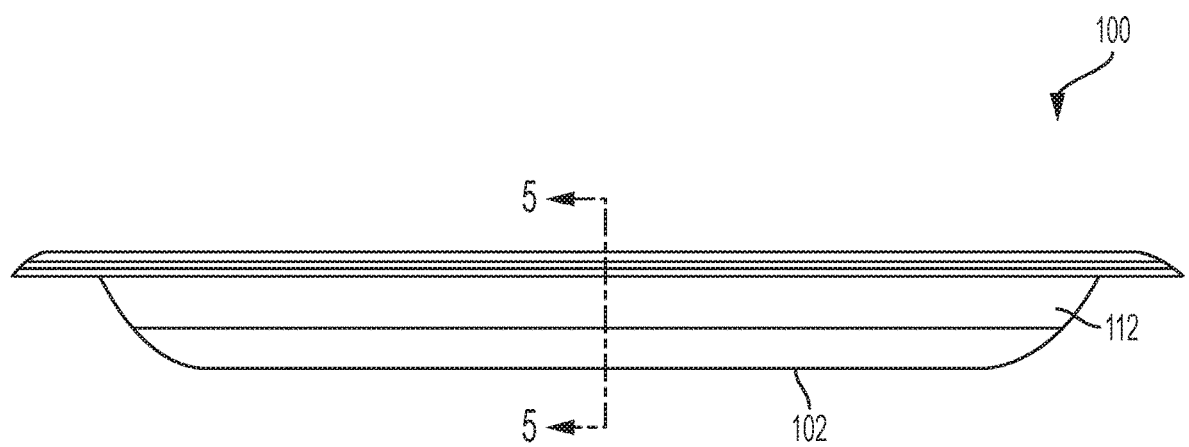
FIG. 3 is a side view of the plate of FIG. 1.

For the purpose of illustration, and not limitation, reference is made to an exemplary embodiment of a plate in accordance with the disclosed subject matter. With reference to FIG. 1-5, a plate 100 of the disclosed subject matter generally includes a bottom wall 102 with an outer perimeter 108. The bottom wall includes an upper surface 104, as shown in FIG. 1, and a lower support surface 106, as shown in FIG. 2. The lower support surface 106 defines a horizontal reference plane 110, as shown in FIG. 5. The bottom wall 102 can have a convex shape in cross-sectional side view extending upwardly and inwardly from the outer perimeter, as also shown in FIG. 5. The convex shape can increase the deflection strength of plate as the shape creates an arch structure that allows an applied force to be redistributed throughout the plate. The convex shape also increases the stability of the plate, for example when the plate is on a flat surface. On a flat surface, the convex shape is configured for the outer perimeter 108 of the bottom wall 102 to make contact with the flat surface without the center portion contacting the flat surface. As such, the distance between the points of the plate in contact with the base is large, which provides a wide base for high stability.

Figure 4:
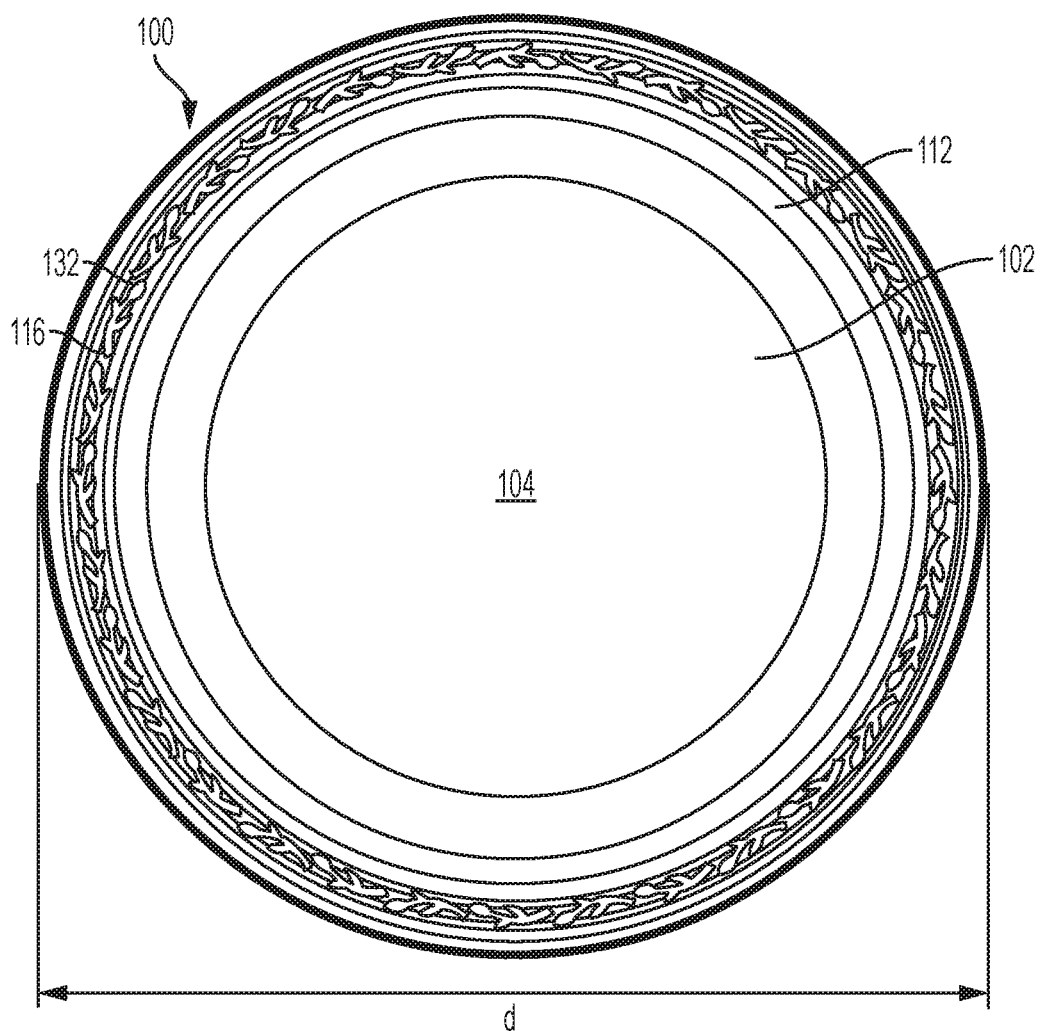
FIG. 4 is a top view of the plate of FIG. 1.
Figure 5:
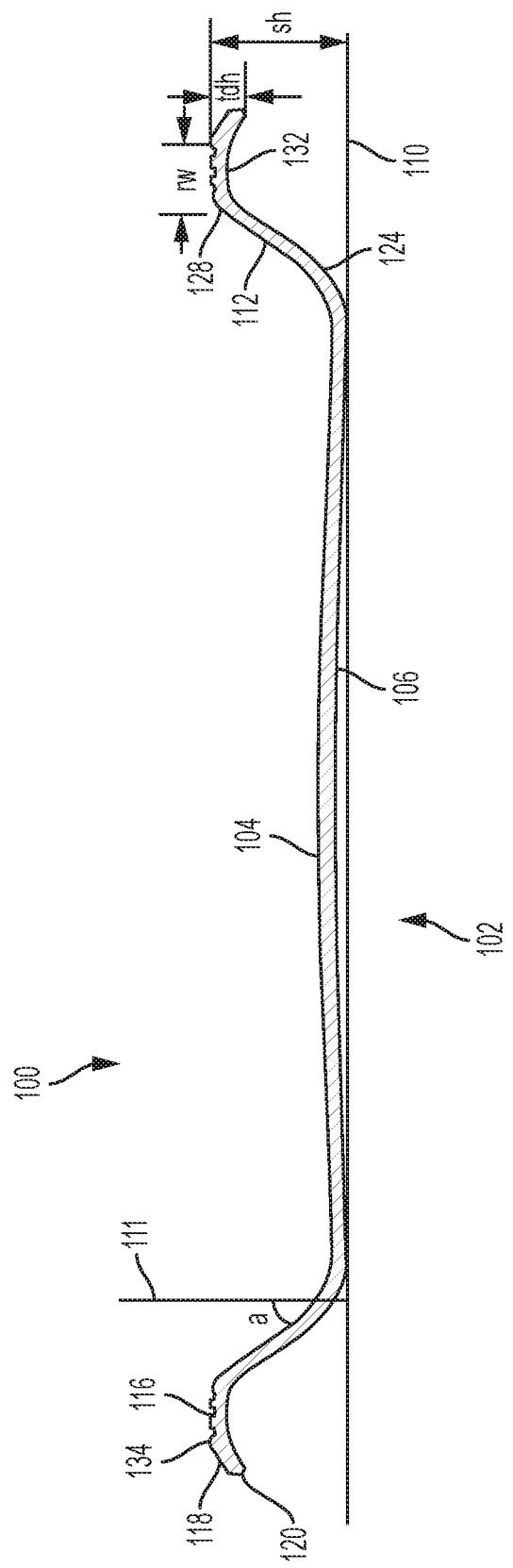
FIG. 5 is a cross-sectional side view of the plate of FIG. 1 taken along line 5-5 of FIG. 3.

As embodied herein, the outer perimeter 108 of the bottom wall 102 can define a circle in plan view, as shown in FIG. 4. That is, the outer perimeter 108 as embodied herein for purpose of illustration and not limitation is generally in a circular shape, but the outer perimeter 108 can also be provided with a variety of other shapes (e.g., rectangular, hexagonal, square, octagonal, triangular) in accordance with the disclosed subject matter.

For purpose of illustration and understanding, reference is now made to additional features of the plate configuration of the disclosed subject matter when made of a polyethylene terephthalate foam. Such features of the plate configuration provide desired performance and strength characteristics for the plate when made of polyethylene terephthalate foam. Additional details regarding the polyethylene terephthalate foam for the plate of the disclosed subject matter are set forth further below.

As previously noted, the plate of the disclosed subject matter includes a sidewall 112 extending outwardly and upwardly from the outer perimeter 108 at an angle "a" within a range of 30° to 35° relative to a vertical axis perpendicular to the horizontal reference plane, as shown in FIG. 5. For example, the angle "a" can be about 34.25° as embodied herein with reference to a polyethylene terephthalate foam plate as set forth in further detail below, relative to a vertical axis 111 perpendicular to the horizontal reference plane 110. The plate 100 disclosed herein, when used for holding items, such as food items or the like, the bottom wall and sidewalls can retain items in place during use with greater effectiveness than conventional plates having more shallow side walls. Additionally, the steeper sidewall increases the deflection strength of the plate by dispersing an applied force throughout the plate, as set forth in greater detail below. Furthermore, the increased sidewall does not impair the stackability of the plate, and thus allows for storing, shipping, and displaying of a large number of plates.

As shown in FIG. 5, a bottom-sidewall interface 124 can be defined between the bottom wall 102 and the sidewall 112. The bottom-sidewall interface 124 can have a radius in cross-sectional side view. The radius can be within a range of 0.5 inch to 0.8 inch, and as embodied herein about 0.63 inch. The sidewall 112 can extend outwardly and upwardly from the outer perimeter 108 overall sidewall height "sh" defined vertically between the horizontal reference plane 110 and the upper edge of the sidewall 112. The sidewall height "sh" can be within a range of 0.7 inch to 1.0 inch.

Plate 100 further includes a rim 116 extending laterally outwardly from the upper edge of the sidewall 112, as shown in FIG. 5. A sidewall-rim interface 128 can be defined between the sidewall 112 and the rim 116, and the sidewall-rim interface 128 can have a radius in cross-sectional side view. The radius can be within a range of 0.2 inch to 0.3 inch, and as embodied herein about 0.24 inch. The rim can have a rim width "rw" defined laterally between the upper edge of the sidewall 112 and the outer edge of the rim 116. The rim width can be within a range of 0.30 and 0.50 inch, and as defined herein, about 0.40 inch. The rim 116 can include an indicia 132, for example a pattern, marking or text. The indicia 132 shown on the rim 116 in FIG. 1 as a vine pattern is intended for purpose of illustration and not limitation. The indicia, as embodied herein, can increase the aesthetics of the plate, without sacrificing structural integrity.

The plate of the disclosed subject matter also includes a turndown flange 118 extending downwardly from an outer edge of the rim 116 and terminating at free end 120. As shown in FIG. 5, the turndown flange 118 has a turndown height "tdh" defined vertically between the outer edge of the rim 116 and the free end 120. As embodied herein, for purpose of illustration and not limitation, the "tdh" can be in a range of about 0.06 and 0.44 inch, and as embodied herein about 0.18 inch. The turndown heights disclosed herein allow increase the manufacturability and deflection strength of the plate 100 of the disclosed subject matter. The turndown height "tdh" and rim width "rw" thus can have a ratio of about 1:2.19. A rim-turndown interface 134 can be defined between the rim 116 and the turndown flange 118, the rim-turndown interface can have a radius in cross-section side view. The radius can be in a range of 0.10 and 0.45 inch, and as embodied herein about 0.37 inch. The rim 116 and the turndown flange 118 can form a turndown angle of between 30° and 35°.

As shown in FIG. 4, the plate can be sized to have a maximum cross dimension in plan view of less than 10.5 inches. Still referring to FIG. 4, the rim 116, turndown flange 118, and free end 120 are generally circular in shape in plan view, but can also be provided with a variety of other shapes if preferred (e.g., rectangular, hexagonal, square, octagonal, triangular).

Figure 6:
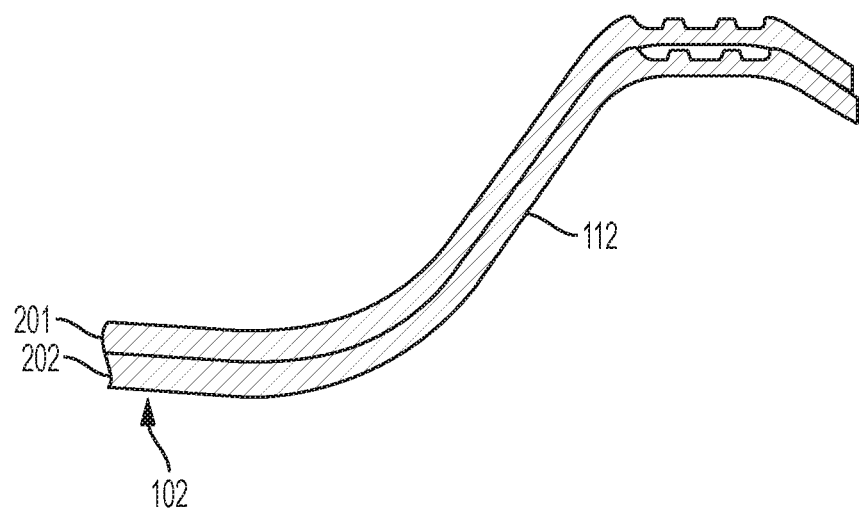
FIG. 6 is an enlarged cross-sectional detail view of two plates of FIG. 5 in a stacked relationship.

With the plate configuration of the disclosed subject matter, a plurality of such plates can be stacked for shipping, storage, and the like. For illustration and not limitation, FIG. 6 depicts two plates in stacked relationship. As shown in FIG. 6, a first plate 201 can be stacked in a mated relation with a second plate 202. Plates 201 and 202 each include the properties of the plate 100 according to the disclosed subject matter as set forth above. As shown in FIG. 6, the bottom surface of plate 201 can be substantially adjacent with the top surface of plate 202 to allow for efficient stackability. For purpose of illustration, and not limitation, the increase in height from a single plate 100, and two stacked plates 201, 202 is thus in the range of 0.06 inch and 0.10 inch. This relatively small height difference allows for efficient stacking of plates 201, 202, which reduces the cost to ship, store, and display a plurality of plates of the disclosed subject matter.

As previously noted, and in accordance with another aspect of the disclosed subject matter, the plate is made of or comprises a monolithic structure of polyethylene terephthalate foam. The plate 100 can comprise polyethylene terephthalate foam in combination with one or more additional materials, including but not limited to, polystyrene foam, molded fiber, and aluminum. Alternatively, the plate 100 can consist essentially of polyethylene terephthalate foam, and particularly amorphous polyethylene terephthalate foam. The polyethylene terephthalate foam can have a basis weight between 10.50 and 20 grams per 100 in$^2$. For example, the polyethylene terephthalate foam can have a basis weight of about 12.6 grams per 100 in$^2$ or about 15.3 grams per 100 in$^2$.

The plate of the disclosed subject matter includes a sidewall 112 extending outwardly and upwardly from the outer perimeter 108 at an angle "a", as shown in FIG. 5. The angle "a" can be within a range of 30° to 35°, such as about 34.25° as embodied herein with reference to a polyethylene terephthalate foam plate as set forth in further detail below, relative to a vertical axis 111 perpendicular to the horizontal reference plane 110. The plate 100 disclosed herein, when used for holding items, such as food items or the like, the bottom wall and sidewalls can retain items in place during use with greater effectiveness than conventional plates having a more shallow side walls. Additionally, the steeper sidewall increases the deflection strength of the plate by dispersing an applied force throughout the plate, as set forth in greater detail below. Furthermore, the increased sidewall does not impair the stackability of the plate, and thus allows for storing, shipping, and displaying of a large number of plates.

As set forth in the Examples below, various ranges of parameters for the polyethylene terephthalate foam plate of the disclosed subject matter are provided or established. For example, the plate 100 can include a strength to weight ratio of between 0.12 and 0.18 pound of force per gram. The plate 100 can have a maximum thickness between about 0.03 and 0.10 inch. Furthermore, the pressure required to puncture the plate 100 can be between about 1480 and 3840 pounds per square inch. The load required to puncture the plate 100 can be between about 1.04 and 2.7 pounds applied over an area of about 0.000707 square inch. Additional details regarding these parameters are set forth below.

Further in accordance with the disclosed subject matter, the plate can be formed of polyethylene terephthalate foam with the following method. That is, a sheet of polyethylene terephthalate foam can be provided and then thermoformed to form a plate of as described above. The polyethylene terephthalate foam sheet, which can be in the form of a continuous web or separate sheet materials, can be formed into the plate 100 using any known method in the manufacturing arts, such as with a die and/or mold. For purpose of illustration the polyethylene terephthalate foam can then be heated a second time to expand the polyethylene terephthalate foam. The heating temperature of the second heating can exceed the temperature of the first heating. If the polyethylene terephthalate foam is not in an amorphous morphology prior to the formation method, the first and/or second heating process can substantially convert the foam from an alternative morphology, such as a crystalline morphology. A mold used for forming the plate 100 can include texture to provide the resulting plate 100 with a desirable look and feel.

Although reference is made to plates, the disclosed subject matter can likewise apply to additional or alternative container configurations, such as a bowl or the like. The disclosed subject matter is not limited to plate configurations and can apply to additional or alternative configurations, such as a bowl. A bowl of the disclosed subject matter can include a sidewall extending outwardly and upwardly from an outer perimeter of a bottom portion at an angle "a" relative to a vertical axis perpendicular to a horizontal reference plane. The angle "a" can be within a range of 30° to 35°, such as about 34.25°, wherein the bowl is made of polyethylene terephthalate foam. As such, and as used herein, the term "plate" is intended to cover other container types such as bowl or the like.

EXAMPLES

The presently disclosed subject matter will be better understood by reference to the following Examples. These Examples are merely illustrative of the presently disclosed subject matter and should not be considered as limiting the scope of the subject matter in any way. Unless otherwise stated, the plates of the following example have the following dimensions: a maximum cross section diameter of about 8.6 inches, a sidewall angle "a" of about 34.25°, a turndown height "tdh" of 0.18 inch; a sidewall height "sh" of about 0.80 inch, a radius of the sidewall-rim interface of about 0.24 inch, a rim width of about 0.40 inch, and a radius of the rim-turndown interface of about 0.37 inch.

Example 1

In a first Example, tests were performed on actual samples of various plate configurations according to the disclosed subject matter. Plates of the embodiments described herein were configured with a first and second configuration of basis weight 10.5 and 15.3 grams per 100 in$^2$, respectively. First and second configurations were made entirely of the polyethylene terephthalate foam and were compared to a control testing plate including only a paper material. A microwave fitted with microwave safe temperature probes was used to measure bottom of the plates during heating. Frozen lasagnas of similar size and weight were placed on each plate and heated, uncovered, for five minutes. The test was repeated three times for each plate, resulting in 9 tests. The first configuration resulted in bottom plate temperatures ranging from about 110° F. to 145° F. The second configuration resulted in bottom plate temperatures ranging from about 112° F. to 142° F. The paper plate configuration resulted in bottom plate temperatures ranging from about 152° F. to 185° F. Thus, the first and second plate configurations provided significantly lower temperatures on the lower support surface 106 of the plates as compared to the control paper plate. A number of similar tests were performed using a variety of other food and microwave configurations and produced substantially similar results. Accordingly, the polyethylene terephthalate foam material increases insulation and reduces heat transfer through the plate. This increased insulation property is beneficial in a variety of situations and circumstances, for example, to prevent harm or discomfort to a user when hot food is placed on the plate.

Example 2

In a second Example, a further test was performed on the plate 100 of the disclosed subject matter to evaluate the deflection distance of the plate. Using finite element analysis, a constant force of 2.0 pounds was applied at the center of the plate and a point on the outer perimeter of the plate 108 was held fixed. The plate with a sidewall angle "a" in the range of 32° to 35° relative the vertical axis was compared to a substantially similar plate with a sidewall angle "a" in the range of 45° to 55° relative the vertical axis. The plate with a sidewall in the range of 32° to 35° deflected a distance of 0.137 inch, while the plate with a sidewall in the range of 45° to 55° deflected a distance of 0.186 inch. Thus, the steeper sidewall angle improves the deflection strength of the plate.

Example 3

In a third Example, further tests were performed to evaluate the properties of a plate made entirely of polyethylene terephthalate foam. Plates were tested at four different basis weights: low density plates having a basis weight of about 10.50 grams per 100 in$^2$, medium density plates having a basis weight of about 12.9 grams per 100 in$^2$, high density plates having a basis weight of about 15.3 grams per 100 in$^2$, and ultra-high density plates having a basis weight of about 16.8 grams per 100 in$^2$.

The plates were tested for weight, deflection strength, strength to weight ratio and puncture strength. For the deflection strength test, a load of between 1.01 and 2.09 pounds was applied to the center of the plate, and the plate was supported at a location proximate the outer perimeter. The load required to deflect the center of the plate 1.0 inch, measured vertically at the point of load contact, was measured. This test is designed simulate a consumer holding a plate with one hand, with fingers under the plate bottom and the thumb resting on the rim. For the puncture strength test, the load required to puncture the plate over an area of 0.000707 in$^2$ was measured in pounds. Additionally, the pressure in pounds per square inch was measured to determine the amount of pressure required to puncture each plate.

Table 1 provides the overall maximum and minimum measured values of plate weight, max load, and strength to weight ration of each of the following four evaluated plate densities: low density (e.g., basis weight of 10.50 grams per 100 in$^2$), medium density (e.g., basis weight of 12.9 grams per 100 in$^2$), high density (e.g., basis weight of 15.3 grams per 100 in$^2$) and ultra-high density (e.g., basis weight of 16.8 grams per 100 in$^2$). Table 1 further provides the overall maximum and minimum measured values of the full puncture load and full puncture pressure of each of the following three evaluated plate densities: low density, medium density, and high density.

TABLE 1

|  | Plate Weight (g) | Max Load (lb) | Strength to Weight Ratio (lb/g) | Full Puncture Load (lb) | Full Puncture Pressure (psi) |
| --- | --- | --- | --- | --- | --- |
| Maximum | 12.1 | 1.94 | 0.18 | 2.72 | 3840 |
| Minimum | 6.1 | 0.77 | 0.12 | 1.04 | 1480 |

Table 2 provides the average, maximum and minimum measured values of low density plates (e.g., basis weight of 10.50 grams per 100 in$^2$).

TABLE 2

|  | Plate Weight (g) | Max Load (lb) | Strength to Weight Ratio (lb/g) | Full Puncture Load (lb) | Full Puncture Pressure (psi) |
|---|---|---|---|---|---|
| Average | 6.3 | 0.94 | 0.15 | 1.49 | 2100 |
| Maximum | 6.5 | 1.06 | 0.17 | 1.81 | 2560 |
| Minimum | 6.1 | 0.77 | 0.12 | 1.04 | 1480 |

Table 3 provides the average, maximum and minimum measured values of medium density plates (e.g., basis weight of 12.9 grams per 100 in$^2$).

TABLE 3

|  | Plate Weight (g) | Max Load (lb) | Strength to Weight Ratio (lb/g) | Full Puncture Load (lb) | Full Puncture Pressure (psi) |
|---|---|---|---|---|---|
| Average | 7.8 | 1.56 | 0.20 | 1.74 | 2470 |
| Maximum | 8.2 | 1.73 | 0.22 | 2.42 | 3420 |
| Minimum | 7.6 | 1.28 | 0.16 | 1.33 | 1890 |

Table 4 provides the average, maximum and minimum measured values of high density plates (e.g., basis weight of 15.3 grams per 100 in$^2$).

TABLE 4

|  | Plate Weight (g) | Max Load (lb) | Strength to Weight Ratio (lb/g) | Full Puncture Load (lb) | Full Puncture Pressure (psi) |
|---|---|---|---|---|---|
| Average | 9.5 | 1.57 | 0.17 | 2.25 | 3190 |
| Maximum | 9.9 | 1.77 | 0.18 | 2.72 | 3840 |
| Minimum | 9.3 | 1.39 | 0.14 | 1.84 | 2610 |

Table 5 provides the average, maximum, and minimum measured values of ultra-high density plates (e.g., basis weight of 16.8 grams per 100 in$^2$).

TABLE 5

|  | Plate Weight (g) | Max Load (lb) | Strength to Weight Ratio (lb/g) |
|---|---|---|---|
| Average | 10.4 | 1.65 | 0.16 |
| Maximum | 12.1 | 1.94 | 0.18 |
| Minimum | 9.5 | 1.37 | 0.14 |

Example 4

In a fourth Example, further tests were performed to evaluate the stackability of the plate 100. The height of a single plate of the disclosed subject matter was first measured in inches. A count of plates of the disclosed subject matter were stacked together. The height of the stack of the counted plates was measured in inches. Finally, the pitch between the plates was determined in inches. In a plate stack, the pitch represents the value from the top rim of a bottom plate to the bottom rim of a top plate. The pitch can be determined by measuring the height of the stack, subtracting the height of a single plate, and dividing the remaining height by the remaining plate count. Plates were tested at three different basis weights: low density plates having a basis weight of about 10.50 grams per 100 in$^2$, medium density plates having a basis weight of 12.9 grams per 100 in$^2$, and high density plates having a basis weight of 15.3 grams per 100 in$^2$.

Table 6 provides average, maximum and minimum measured values of low density plates.

TABLE 6

|  | Plate Count | Single Plate Height (in) | Stack Height (in) | Pitch |
|---|---|---|---|---|
| Average | 181 | 0.834 | 18.333 | 0.098 |
| Maximum | 192 | 0.835 | 18.420 | 0.103 |
| Minimum | 170 | 0.832 | 18.248 | 0.092 |

Table 7 provides average, maximum and minimum measured values of medium density plates.

TABLE 7

|  | Plate Count | Single Plate Height (in) | Stack Height (in) | Pitch |
|---|---|---|---|---|
| Average | 174 | 0.828 | 18.244 | 0.101 |
| Maximum | 174 | 0.829 | 18.486 | 0.102 |
| Minimum | 173 | 0.826 | 18.002 | 0.100 |

Table 8 provides average, maximum and minimum measured values of high density plates.

TABLE 8

|  | Plate Count | Single Plate Height (in) | Stack Height (in) | Pitch |
|---|---|---|---|---|
| Average | 182 | 0.815 | 18.750 | 0.099 |
| Maximum | 183 | 0.817 | 18.796 | 0.100 |
| Minimum | 180 | 0.812 | 18.703 | 0.099 |

While the disclosed subject matter is described herein in terms of certain illustrations and examples, those skilled in the art will recognize that various modifications and improvements may be made to the disclosed subject matter without departing from the scope thereof. Moreover, although individual features of one embodiment of the disclosed subject matter may be discussed herein or shown in the drawings of one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for the purposes of illustration and description. It is not intended to be exhaustive or to limit the disclosed subject matter to those embodiments disclosed.

The description herein merely illustrates the principles of the disclosed subject matter. Various modifications and alterations to the described embodiments will be apparent to those skilled in the art in view of the teachings herein. Accordingly, the disclosure herein is intended to be illustrative, but not limiting, of the scope of the disclosed subject matter.

What is claimed is:

1. A plate comprising:
a bottom wall having an outer perimeter, an upper surface, and a lower support surface defining a horizontal reference plane;
a sidewall extending upwardly and outwardly from the outer perimeter at a constant angle "a" of between about 30° to about 35° relative to a vertical axis perpendicular to the horizontal reference plane along the entire outer perimeter;
a rim extending laterally outwardly from an upper edge of the sidewall, the rim having a rim width "rw" defined laterally between the upper edge of the sidewall and an outer edge of the rim; and
a turndown flange extending downwardly from an outer edge of the rim and terminating at a free end, the turndown flange having a turndown height "tdh" defined vertically between the outer edge of the rim and the free end, the ratio of the turndown height to the rim width (tdh:rw) being between about 1:0.7 and 1:8.3;
wherein the plate comprises a monolithic structure of polyethylene terephthalate foam.

2. The plate of claim 1, wherein the angle "a" of the sidewall relative to the vertical axis is about 34.25°.

3. The plate of claim 1, wherein the polyethylene terephthalate foam is amorphous polyethylene terephthalate foam.

4. The plate of claim 1, wherein the plate consists essentially of polyethylene terephthalate foam.

5. The plate of claim 1, wherein the polyethylene terephthalate foam material has a basis weight between about 10.5 and 20 grams per 100 in$^2$.

6. The plate of claim 1, wherein with the plate supported at a location proximate the outer perimeter, a load between about 0.75 and 2.1 pounds applied at a center of the plate deflects the plate about 1.0 inch as measured at the center of the plate.

7. The plate of claim 1, wherein the plate comprises a strength to weight ratio of between about 0.12 and 0.18 pound of force per gram.

8. The plate of claim 1, wherein the plate has a maximum thickness between about 0.03 and 0.10 inch.

9. The plate of claim 1, wherein a pressure required to puncture the plate is between about 1480 and 3840 pounds per square inch.

10. The plate of claim 1, wherein a load required to puncture the plate is between about 1.04 and 2.7 pounds applied over an area of about 0.000707 square inch.

11. The plate of claim 1, wherein the bottom wall has a convex shape in cross-sectional side view extending upwardly and inwardly from the outer perimeter.

12. The plate of claim 1, wherein the outer perimeter of the bottom wall defines a circle in plan view.

13. The plate of claim 1, wherein a bottom-sidewall interface is defined between the bottom wall and the sidewall, the bottom-sidewall interface having a radius in cross-sectional side view.

14. The plate of claim 13, wherein the radius of the bottom-sidewall interface is about 0.63 inch.

15. The plate of claim 1, wherein the sidewall has an overall sidewall height "sh" defined vertically between the horizontal reference plane and the upper edge of the sidewall of between 0.7 inch and 1.0 inch.

16. The plate of claim 1, wherein a sidewall-rim interface is defined between the sidewall and the rim, the sidewall-rim interface having a radius in cross-sectional side view.

17. The plate of claim 16, wherein the radius of the sidewall-rim interface is about 0.24 inch.

18. The plate of claim 1, wherein the rim has a rim width "rw" is between about 0.30 and 0.50 inch.

19. The plate of claim 1, wherein the rim width "rw" is about 0.40 in.

20. The plate of claim 1, wherein an upper surface of the rim comprises an indicia.

21. The plate of claim 1, wherein a rim-turndown interface is defined between the rim and the turndown flange, the rim-turndown interface having a radius in cross-sectional side view.

22. The plate of claim 21, wherein the radius of the rim-turndown interface is about 0.37 inch.

23. The plate of claim 1, wherein the turndown height "tdh" is between about 0.06 and 0.44 inch.

24. The plate of claim 1, wherein the turndown height "tdh" is about 0.18 inch.

25. The plate of claim 1, wherein the ratio of the turndown height to the rim width (tdh:rw) is about 1:2.19.

26. The plate of claim 1, wherein the plate has a maximum lateral cross dimension "d" in plan view of less than 10.5 inches.

27. The plate of claim 1, wherein a stack of substantially identical plates have a stack pitch of between about 0.092 inches and about 0.103 inches.

28. A method of forming a plate, comprising:
providing a sheet of polyethylene terephthalate foam;
thermoforming the polyethylene terephthalate foam into a plate comprising:
a bottom wall having an outer perimeter, an upper surface, and a lower support surface defining a horizontal reference plane;
a sidewall extending upwardly and outwardly from the outer perimeter at a constant angle "a" of between about 30° to about 35° relative to a vertical axis perpendicular to the horizontal reference plane along the entire outer perimeter;
a rim extending laterally outwardly from an upper edge of the sidewall the rim having a rim width "rw" defined laterally between the upper edge of the sidewall and an outer edge of the rim; and
a turndown flange extending downwardly from an outer edge of the rim and terminating at a free end the turndown flange having a turndown height "tdh" defined vertically between the outer edge of the rim and the free end, the ratio of the turndown height to the rim width (tdh:rw) being between about 1:0.7 and 1:8.3.

* * * * *